United States Patent Office.

JOHN McGILL, OF BOSTON, MASSACHUSETTS.

*Letters Patent No.* 54,382, *dated May* 1, 1866; *reissue No.* 3,300, *dated February* 16, 1869.

IMPROVED SOLUTION FOR PREVENTING COMBUSTION.

The Schedule referred to in these Letters Patent and making part of the same.

*To all whom it may concern:*

Be it known that I, JOHN McGILL, of Boston, county of Suffolk, State of Massachusetts, have invented a new and useful Method of Preventing Combustion; and I do hereby declare that the following is a full and exact description thereof.

I use a solution of ten per cent. of crystallized salts of sulphates of ammonia.

When I apply this solution to cotton, linen, or silk fabrics, to prevent their combustion, I proceed as follows:

The fabric to be protected from combustion is steeped in the above solution, and after becoming thoroughly saturated, is dried, and thus prepared to resist the action of flame The solution I use for the purpose above described is neither injurious to the health of the wearer, nor to the articles upon which it is applied; does not offer resistance to the iron in the process of smoothing, nor change the color or texture of the fabric upon which it is applied.

Other applications of my solution will readily suggest themselves.

The chemical action of this solution in extinguishing fire may be explained as follows:

In contact with flame, or when subjected to great heat, the above solution yields gases, which, as is well known, will prevent combustion; in other words, will extinguish flame.

Having thus described my invention,

What I claim as new, and desire to secure by Letters Patent, is—

The application of the aforesaid chemical, for the purpose of preventing combustion, as described.

JOHN McGILL.

Witnesses:

A. HUN BERRY,

FRANK G. PARKER.